July 10, 1951 E. F. LOWEKE 2,559,886
BRAKE VALVE ASSEMBLY
Filed Aug. 23, 1948
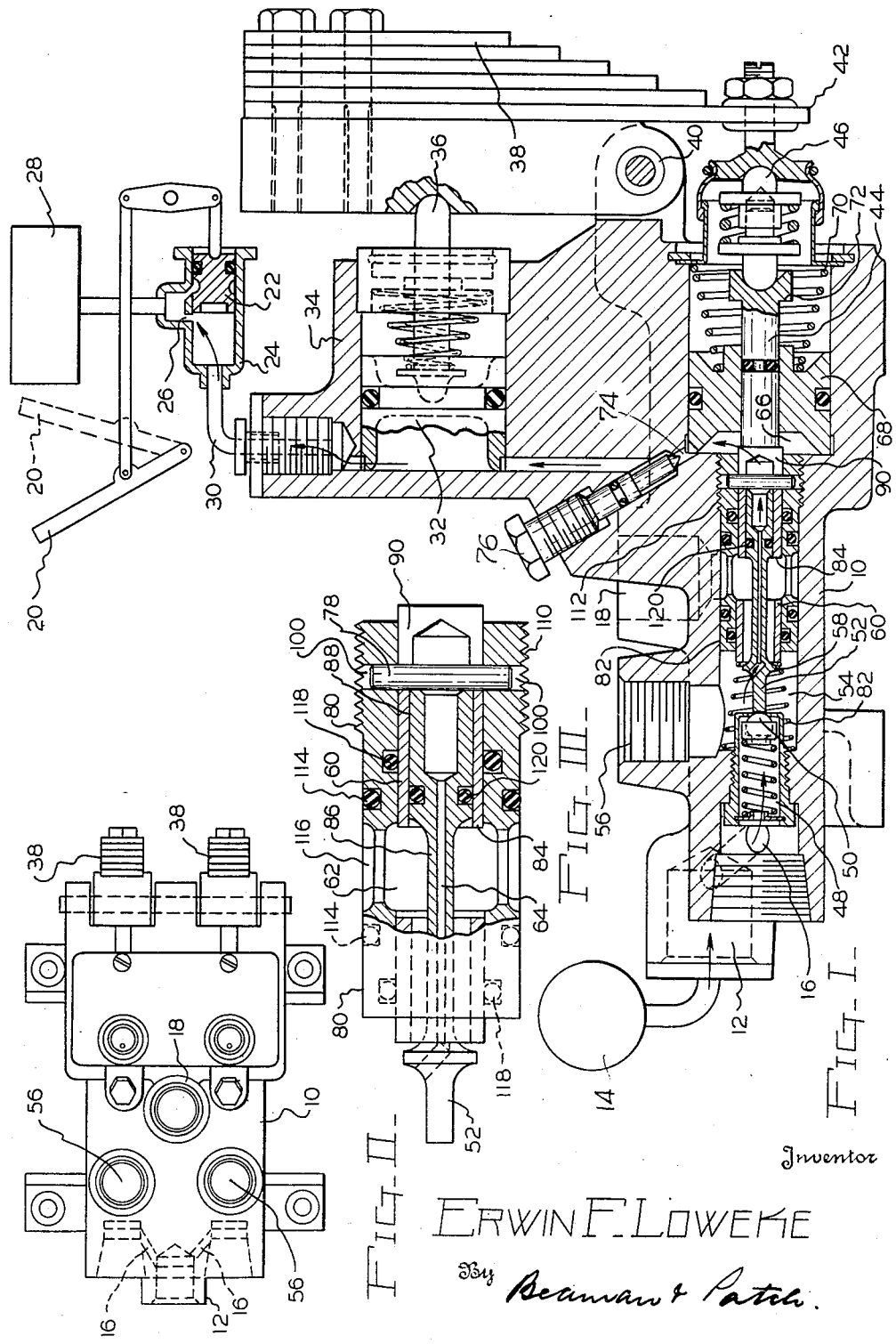
Inventor
ERWIN F. LOWEKE
By Beaman & Patch Patented July 10, 1951

2,559,886

UNITED STATES PATENT OFFICE 2,559,886

BRAKE VALVE ASSEMBLY

Erwin F. Loweke, Jackson, Mich., assignor, by mesne assignments, to The B. F. Goodrich Company, Akron, Ohio, a corporation of New York Application August 23, 1948, Serial No. 45,749

7 Claims. (Cl. 277—20)

The present invention relates to hydraulic pressure regulating valves, as employed in connection with hydraulic brakes and the like and of the type in which the regulator valve has a casing with an axial bore containing an inlet valve with an aligned actuating rod therefor, this rod being actuated by pressure applied thereto in consequence of actuation of the brake pedal and being operatively associated with an encircling sleeve structure, providing communication between the brake and return chambers, and a displacement chamber, which is choke fed with operating liquid from the brake chamber in order to synchronize the "feel" at the brake pedal with the application of the brakes.

The above described type of regulator valve therefore requires the use of a concentric rod and sleeve assembly which has to be precisely fitted within the valve casing and necessitates the provision of efficient sealing means between the relatively slidable parts, with provision for adjustment for wear and adjustment of the assembly as a whole while in situ.

The invention has for its object to provide such a rod and sleeve assembly in the form of a cartridge which is capable of being fitted within the bore portion of the regulator valve casing, such that the unit can be readily removed for repair or replacement, and can itself be readily adjusted, while in situ, for the locating thereof in its required operating position.

The invention also has for its object to provide a removable or replaceable cartridge unit for fitting into the bore portion of a regulator valve of the above type, which unit incorporates the inlet valve actuating rod as well as a sleeve valve for controlling the flow of the operating liquid between the brake and return chambers of the regulating valve, and a stop member for limiting the axial movement of the rod and the sleeve valve and for tying the parts (the rod and sleeve) to an outer sleeve, which constitutes the outer body of the cartridge unit and is capable of being screwed or otherwise adjustably fitted into the bore portion of the regulator valve casing.

This cartridge unit also incorporates its own sealing rings, which can be easily replaced, as also can be different parts of the unit, if and when desired.

These and further objects and advantages will appear clear from a consideration of the following description with reference to the drawings in which:

Fig. I is a diagrammatic representation of a hydraulic brake system incorporating a brake regulating valve in accordance with the invention, with the valve shown in longitudinal section, Fig. II is a plan view of the brake valve shown in Fig. I, and Fig. III is an enlarged view of the cartridge unit provided in accordance with invention, partly in section and partly in elevation.

Referring to the drawings, a dual valve 10 is shown having a common connection 12 with a pressure accumulator 14 and lateral passages 16 for distributing the fluid pressure to the dual valve sections which are of identical construction and operation with the return connection 18 the only other common part. Only one of the valve sections will be described. Also it will be understood that the invention can be readily applied to a single valve arrangement as compared with this dual arrangement.

To operate one of the valve sections of the valve 10 to apply the brakes, the brake pedal 20 is moved toward the dotted line position to displace the piston 22 in the master cylinder 24, closing the compensating port 26 leading to the supply tank 28. Continued movement of the piston 22 forces the fluid through the line 30 against the piston 32 to displace the same in a cylinder 34. Movement of the piston 32 is transferred through the push rod 36 to the leaf spring actuator 38 which pivots around the hinge point 40. The lower end 42 of the actuator 38 transfers its movement to the valve actuating stem 44 through a spring cushion ball-and-socket thrust unit 46.

Fluid pressure from the accumulator 14 flows through the passage 16 into the inlet chamber 48 and acts to hold the inlet valve 50 to its seat. When the valve 50 is opened by the pin portion 52, the fluid pressure then flows into the brake chamber 54 and out through the connection 56 to the brakes. Return fluid from the brakes flows through the return valve, consisting of a head 58 and a sleeve 60, into the return chamber 62, and out through the return connection 18.

The choke arrangement for synchronizing the "feel" at the pedal with the brake operation takes the form of a restricted passage 64 extending between the brake chamber 54 and the displacement chamber 66, in which the piston 68 is located and urged to the position shown in Fig. I by the spring 70. When the piston 68 is sufficiently displaced to engage the shoulder 72, the delayed pressure "feel" of the brake chamber 54 against the enlarged area of the piston 68 is transferred back to the pedal 20 through the unit 46 and the associated structure. Between the chamber 66 and the cylinder 34 is a bleeder port 74 regulated by the bleeder screw 76.

The valve stem 44 engages the slotted end of the sliding sleeve 60 which slot receives the stop pin 78, mounted in the fixed outer sleeve 80. A spring 82 urges the sleeve 60 against the pin 78. Slidable in the sleeve 60 is a valve part 84 in which the restricted passage 64 is defined and of which the valve head 58 and the pin 52 may be an integral part thereof as shown in the illustrated embodiment. Movement of the rod 44 to the left, as viewed in Fig. I, first brings the left end of the sleeve 60 into engagement with the valve head 58 to close the return port leading to the return chamber 62. Continued movement of the sleeve 60 moves the valve port 84 and its associated structure to open the inlet valve 50 through displacement by the pin 52. In this manner the pressure of the accumulator 14 is directed to the brakes. To keep the return port closed it is necessary to overcome the tension of the spring 82 and the delayed pressure exerted against the piston 68.

To bleed the system described, with the bleeder screw 76 loosened and the compensating port 26 opened, the actuator 38 is manually pivoted clockwise to open the valve 50. Fluid pressure from the accumulator 14 will then flow along the path defined by the arrows shown in Fig. I, flushing the complete system and bleeding all air from the system into the supply tank 28. The bleeder screw 76 is thereafter tightened and the system is ready for operation through the pedal 20.

Manual actuation of the actuator 38 is possible by the operator applying alternate pulling and pushing forces thereto at its end remote from the hinge point 40. This produces reciprocation of the piston 32 and thereby gives rise to a kind of pumping action which causes the bled fluid to be discharged through the open port 26, the latter being maintained open during the bleeding operation.

Upon the actuator 38 being swung clockwise due to actuation of the brake pedal 20 and the consequential pressure exerted upon the actuator through the medium of the push rod 36 and its associated piston 32, the shoulder 72 will be advanced upon the piston 68 as the rod 44 is pushed to the left (as seen in Fig. I) to cause the pin 52 to push against and open the inlet valve 50. During application of the brakes however the fluid pressure will build up within the chamber 66 and cause the piston to travel to the right. In so doing the condition will be obtained when this piston movement, by contact of the piston with the shoulder 72, will cause a force to be exerted upon the lower end of the actuator 38 sufficient to swing the latter anti-clockwise about the pivot 40. Such movement of the actuator will react upon the piston 32 to cause the latter to move to the left and thereby give rise to the full "load feel" effect at the depressed brake pedal 20 in the well known manner. At the same time, that is when the rod 44 is being pushed to the right to its original or starting position, the inlet valve 50 will be permitted to close under the action of its spring.

The above description renders clear the construction and operation of the type of regulator valve to which the present invention relates.

The essence of the invention, however, resides in the construction of the inlet valve operating part 52, the sleeve 60, and the sleeve 80 as a unit, in the form of a cartridge which can be separately constructed as such and handled as a unit for insertion in the end of the bore 82 of the regulator valve casing 10.

To this end it will be seen upon reference to Fig. III in particular that the above described parts 52, 64 and 84 are incorporated in an integral rod 86 having the choke passage 64 passing through its center and formed at its right hand end 88 to come up against the cross pin 78, which latter therefore, forms a stop to limit movement of this rod 86 to the right as well as forming also a stop to limit also movement of the outer valve sleeve 60 to the right.

The cross pin 78 passes through a screw-driver slot 90 formed in the right hand end of the sleeve valve 60 and at its opposite ends engages, and is located, in the opposed holes 100.

This cross pin 78 therefore, not only forms a stop for the rod 86 and sleeve 60, as above stated, but also serves to tie these parts to the outer sleeve 80 to give the required unit cartridge construction.

The outer surface of the outer sleeve 80 is screw-threaded as indicated at 110 for engagement with the screw-threaded interior portion 112 of the bore 82.

The slot 90 serves to receive a screw-driver or like implement by which the cartridge unit can be readily screwed and adjusted into correct operative position with respect to the inlet valve 50 and the return connection 18 or be removed, as required.

Sealing rings provided in annular grooves in the outside surface of the sleeve 80 on opposite sides of the side openings 116 therein (these openings being adapted to register with the return connection 18) serve to seal this sleeve with respect to the bore 82 whereas a similar arrangement of sealing rings 118 on the inside surface of the sleeve 80 serve to seal the latter with respect to the interior sleeve 60. As to the sealing of the end portion 84 of the rod 86 with respect to the sleeve 60, this is afforded by the sealing ring contained in an annular groove in the outer surface of this end portion.

Having thus described my invention, what I claim as new and desire to cover by Letters Patent is:

1. A valve cartridge unit adapted for use with a hydraulic regulator valve for brakes and the like, to provide for the opening of the regulator inlet valve as well as for the return flow of the pressure liquid from the regulator brake chamber and for a choked flow of the pressure liquid to the displacement chamber for synchronizing the "feel" at the pedal with the application of the brakes, said cartridge unit comprising an outer sleeve adapted to be adjustably and removably secured within the bore portion of the body part of the regulator valve containing said inlet valve and the brake and displacement chambers, an inner sleeve member slidably mounted within and carried by said outer sleeve, a separate rod member extending through the interior of said inner sleeve and defining, with registering openings in the latter and the outer body part, the said return chamber for the brake pressure liquid, said rod being also slidable within the said inner sleeve to permit the rod to actuate the regulator inlet valve, said inner and outer sleeves and said rod having registering side openings, and a common connector member engaged in said openings and connecting said sleeves and rod in unified telescoped relation, said connector member being removable from said openings to free the sleeves and rod for separation when the cartridge unit is removed from the regulator body part.

2. A replaceable valve cartridge unit as claimed in claim 1 wherein said rod member has an end plunger portion slidable within the outer end portion of said sleeve valve member remote from the inlet valve actuating end thereof and sealing means is provided for maintaining a fluid seal between said plunger portion and the said sleeve valve end portion.

3. A replaceable valve cartridge as claimed in claim 1 wherein said outer sleeve carries sealing rings for maintaining sealing contact with the bore portion of the regulator valve casing and sealing means is also provided for maintaining a fluid seal between the sleeve valve member and the interior of the outer sleeve.

4. A replaceable cartridge unit as claimed in claim 1 wherein said connecting means consists of a diametral cross pin engaged and located at its ends in opposed openings in the outer sleeve and located in its intermediate portion within an axial slot formed in the sleeve valve member from the outer end thereof remote from the valve actuating end of said rod member, said slot affording a means of inserting or removing the cartridge unit by the engagement of a screwdriver or like tool therein.

5. A unitary valve cartridge structure comprising an outer sleeve with a fluid port in its side wall, an inner coaxial sleeve slidably mounted within said outer sleeve and having a fluid port registered with the fluid port in said outer sleeve, a co-axial rod member slidably mounted within said inner sleeve, said rod having a fluid flow passage extending along its interior and providing a restricted fluid flow between opposite ends of the rod, said rod constituting an actuator for an external valve separate from said cartridge structure, and releasable tie means connecting said sleeves and rod together in telescoped relation with the inner sleeve and rod defining a fluid flow passage extending from one end of the outer sleeve to the said registered fluid ports.

6. The invention as defined in claim 5, said outer sleeve having a screw-threaded exterior adapted for the adjustable securing of the cartridge unit within a valve casing structure.

7. The invention as defined in claim 5, said outer sleeve having diametrically opposite holes in its side wall and said rod having an elongated slot in one end thereof, and said tie means comprising a diametral removable pin member extending through said elongated slot and into said holes in telescopic securing relationship with respect to said sleeve and rod, said pin member when removed freeing said sleeves and rod for axial separation from each other.

ERWIN F. LOWEKE.

REFERENCES CITED

The following references are of record in the file of this patent:

UNITED STATES PATENTS

| Number | Name | Date |
| --- | --- | --- |
| 1,855,348 | Hamilton | Apr. 26, 1932 |
| 2,398,855 | Ray | Apr. 23, 1946 |
| 2,430,811 | Gardiner | Nov. 11, 1947 |